United States Patent
Safak et al.

(10) Patent No.: US 11,044,074 B2
(45) Date of Patent: Jun. 22, 2021

(54) METHOD AND SYSTEM FOR STATE ASSOCIATED DEVICE IDENTIFICATION FOR DIGITAL PAYMENTS USING BLOCKCHAIN TECHNOLOGY

(71) Applicant: MASTERCARD INTERNATIONAL INCORPORATED, Purchase, NY (US)

(72) Inventors: Ilgin Safak, White Plains, NY (US); Ramanan Rajapreyar, Dobbs Ferry, NY (US); Niravkumar Pandya, Danbury, CT (US); Olutoyin Oduwole, Easton, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 339 days.

(21) Appl. No.: 16/253,423

(22) Filed: Jan. 22, 2019

(65) Prior Publication Data

US 2020/0235911 A1   Jul. 23, 2020

(51) Int. Cl.
*H04L 9/34* (2006.01)
*G06F 21/64* (2013.01)
*H04L 9/06* (2006.01)
*G06Q 20/38* (2012.01)
*H04L 9/08* (2006.01)
(Continued)

(52) U.S. Cl.
CPC ......... *H04L 9/0637* (2013.01); *G06Q 20/389* (2013.01); *G06Q 20/3829* (2013.01); *H04L 9/0643* (2013.01); *H04L 9/0894* (2013.01); *H04L 9/3073* (2013.01);
(Continued)

(58) Field of Classification Search
None
See application file for complete search history.

(56) References Cited

U.S. PATENT DOCUMENTS 10,567,293 B1 *  2/2020  Pularikkal ........... H04L 47/2491
2016/0191243 A1 *  6/2016  Manning ................ H04L 9/321
713/168
(Continued)

OTHER PUBLICATIONS

Smart District through IoT and Blockchain. Lazaroiu et al. IEEE. (Year: 2017).*
(Continued)

*Primary Examiner* — Venkat Perungavoor
(74) *Attorney, Agent, or Firm* — Buchanan Ingersoll & Rooney PC

(57) ABSTRACT

A method for maintaining state and event information for all of a user's devices associated in a common location using a blockchain where each block includes an event block and a device block within it, where each event and device block refers to an earlier block of the respective type, resulting in a blockchain-in-a-blockchain architecture. The device and event blocks store data regarding each device associated with a user and events related to the devices/user, respectively. Any time a new event occurs, or a device is registered or removed, a new set of blocks is created, where submissions regarding device changes or events can be made by any participant due to the decentralized and public nature of a blockchain. The result is a system where all data regarding a user's registered devices and events is kept in a common location in a manner that is auditable and verifiable.

20 Claims, 5 Drawing Sheets

(51) Int. Cl.
*H04L 9/32* (2006.01)
*H04L 9/30* (2006.01)
*G06F 21/60* (2013.01)

(52) U.S. Cl.
CPC ....... *H04L 9/3247* (2013.01); *G06Q 2220/00* (2013.01); *H04L 2209/38* (2013.01)

(56) References Cited

U.S. PATENT DOCUMENTS

2019/0068562 A1* 2/2019 Iyer .................. H04L 9/3271
2020/0019680 A1* 1/2020 Frederick ............ G06F 21/64
2020/0067705 A1* 2/2020 Brown ............... H04L 9/3231
2020/0154518 A1* 5/2020 Koeppel ............. H04L 63/123
2020/0155944 A1* 5/2020 Witchey ............. H04L 9/3297
2021/0050993 A1* 2/2021 Mazzarella .......... G06F 16/285

OTHER PUBLICATIONS

Blockchain-based Payment Collection Supervision System using Pervasive Bitcoin Digital Wallet. Chen. IEEE. (Year: 2017).*

* cited by examiner

US 11,044,074 B2

METHOD AND SYSTEM FOR STATE ASSOCIATED DEVICE IDENTIFICATION FOR DIGITAL PAYMENTS USING BLOCKCHAIN TECHNOLOGY

FIELD

The present disclosure relates to maintaining state, device, and event information for computing devices using a blockchain, specifically the use of a combination of device and event blocks in a blockchain to update and maintain the status of all computing devices associated with a single user in a common location.

BACKGROUND

When an individual needs to interact with another system using a computing device, the individual must first follow a registration process to register the computing device as being associated with the individual. When a new computing device is used, the individual must again follow the registration process, which may include identifying the user with a user identifier, and verifying the user by requesting cardholder verification on the same device or a previously registered device. Any time an event occurs with the user, such as the binding of a new payment instrument to or removal of a previously bound payment instrument from a computing device, this must be performed separately on every device. Similarly, the user may want to update personal information or other data on one device, which must also be updated on other devices. In any system where there may be multiple data points maintained in a computing device, or where a user may have many computing devices associated therewith, changes to data and events can be a significant undertaking.

Some methods have been developed to ease this process through the use of data synchronization. For example, many cloud-based storage applications will regularly synchronize data on each computing device with which the user is registered, ensuring that any changes on one device propagate to the other registered computing devices. However, these services rely on the use of private data storage that is easily modifiable due to the constant changes in data for synchronization, and, as a result, can be subject to theft, misappropriation, or loss. In addition, there is an inability for any other entity aside from the data synchronization manager to view, add, or edit data without such changes going directly through the data synchronization manager. This is due to the limitation of the underlying technology, which is configured to allow for frequent changes which inherently means, no matter what the actual configuration is, there are and will be security vulnerabilities. Many users may be uncomfortable with a single entity having control of all of their data for multiple computing devices, particularly when the data is being privately held.

Thus, there is a need for a technological solution where state and event information for multiple computing devices associated with a single user can be stored in a common location that does not have the privacy and security concerns of traditional data synchronization methods.

SUMMARY

The present disclosure provides a description of systems and methods for maintaining state and event information for all devices associated with a user in a common location using a blockchain. A traditional blockchain is comprised of a plurality of blocks, where each block stores formatted data, such as related to cryptocurrency transactions or another type of data. In traditional blocks, each block looks the same in terms of what type of data is being included in the block. In the present disclosure, each block includes an event block and a device block within it, where each event and device block refers to an earlier block of the respective type, resulting in a blockchain-in-a-blockchain architecture. The device and event blocks store data regarding each computing device associated with a user and events related to the registered computing devices or other information that may affect the user, respectively. Any time a new event occurs, or a device is registered or removed, a new set of blocks is created, where submissions regarding device changes or events can be made by any participant due to the decentralized and public nature of a blockchain. The result is a system where all data regarding a user's registered computing devices and events is kept in a common location in a manner that is auditable and verifiable, providing a type of synchronization that protects the user's data without allowing control thereof by any single entity.

A method for maintaining state and event information for all devices associated with a user in a common location using a blockchain includes: storing, in a memory of a blockchain node, a blockchain comprised of a plurality of main blocks, where each main block includes a block header and at least one device-event block, the block header includes at least a timestamp, a reference hash value, and a block hash value, each at least one device-event block includes at least one device block and at least one event block, and the plurality of main blocks includes a most recent block as indicated by the timestamp included in the respective block header; receiving, by a receiver of the blockchain node, a device registration message including at least a device identifier associated with a new device and a user identifier associated with a user; creating, by a processing device of the blockchain node, an enrollment event registering the new device to the user, the enrollment event including at least the device identifier; generating, by the processing device of the blockchain node, an event block hash using at least an event hash value included in the event block included in the most recent block and the created enrollment event; generating, by the processing device of the blockchain node, a new event block including at least the generated event block hash; generating, by the processing device of the blockchain node, a device block hash using at least a device hash value included in the device block included in the most recent block and the device identifier; generating, by the processing device of the blockchain node, a new device block including at least the generated device block hash; generating, by the processing device of the blockchain node, a new device-event block including the generated new event block and the generated new device block; generating, by the processing device of the blockchain node, a new block header, where generation of the new block header includes generating a new block hash value by hashing the most recent block, generating a new reference hash value by hashing the new device-event block, and generating a new timestamp; generating, by the processing device of the blockchain node, a new block comprised of the new block header and the new device-event block; and transmitting, by a transmitter of the blockchain node, the generated new block to one or more participants associated with the blockchain.

A system for maintaining state and event information for all devices associated with a user in a common location using a blockchain includes: a blockchain participant configured to transmit a device registration message to a blockchain node, the device registration message including at least a device identifier associated with a new device and a user identifier associated with a user; a memory of the blockchain node configured to store a blockchain comprised of a plurality of main blocks, where each main block includes a block header and at least one device-event block, the block header includes at least a timestamp, a reference hash value, and a block hash value, each at least one device-event block includes at least one device block and at least one event block, and the plurality of main blocks includes a most recent block as indicated by the timestamp included in the respective block header; a receiver of the blockchain node configured to receive the device registration message; a processing device of the blockchain node configured to create an enrollment event registering the new device to the user, the enrollment event including at least the device identifier, generate an event block hash using at least an event hash value included in the event block included in the most recent block and the created enrollment event, generate a new event block including at least the generated event block hash, generate a device block hash using at least a device hash value included in the device block included in the most recent block and the device identifier, generate a new device block including at least the generated device block hash, generate a new device-event block including the generated new event block and the generated new device block, generate a new block header, where generation of the new block header includes generating a new block hash value by hashing the most recent block, generating a new reference hash value by hashing the new device-event block, and generating a new timestamp, and generate a new block comprised of the new block header and the new device-event block; a transmitter of the blockchain node configured to transmit the generated new block to one or more participants associated with the blockchain; and the one or more participants configured to receive the generated new block from the blockchain node.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
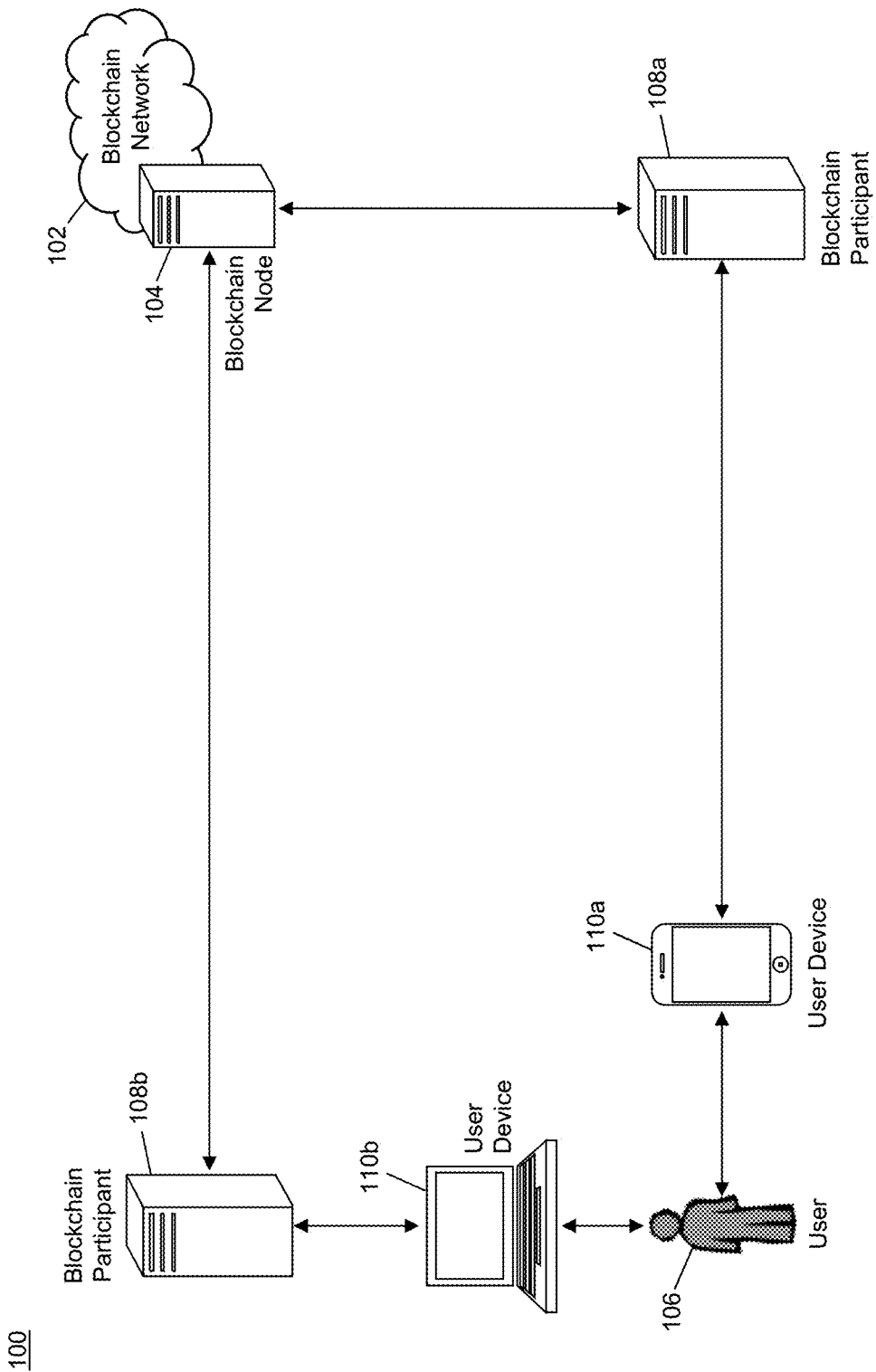
FIG. 1 is a block diagram illustrating a high level system architecture for maintaining state and event information for devices using a blockchain in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency or other type of data. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a digital asset amount or value, such that the blockchain records how much currency, or what other type of data, is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Maintaining Device State and Event Information

FIG. 1 illustrates a system 100 for the maintaining of state and event information for multiple computing devices associated with a single user through the use of a blockchain.

The system 100 may include a blockchain network 102. The blockchain network 102 may be comprised of a plurality of blockchain nodes 104. Each blockchain node 104, discussed in more detail below, may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 102 prior to the generation and addition of a new block to the blockchain in order for the change to be made permanent. Computational and communication limitations may make such a modification exceedingly difficult, if not impossible, thus rendering the blockchain immutable.

In the system 100, a block in the blockchain may include, in addition to the block header, a device-event block as the one or more data values included therein (e.g., the data reference value for the block may be a hash of the device-event block, or multiple device-event blocks, as applicable). The device-event block may be comprised of at least a device block and an event block that may be combined using any suitable method. As discussed in more detail below, a device block may be used to store information regarding user devices 110 that are associated with a user 106, while an event block may be used to store information regarding events associated with the user 106 and/or the user devices 110 associated therewith. User devices 110 may be any type of computing device that may be registered with the blockchain network 102 where data associated therewith may be stored in the blockchain as discussed herein. For instance, the user device 110 may be a desktop computer, laptop computer, notebook computer, tablet computer, cellular phone, smart phone, smart watch, smart television, wearable computing device, implantable computing device, set top box, game console, internet of things device, smart appliance, etc.

In some cases, a device or event block may be comprised of a block header and one or more data values. In such cases, the block header may include a timestamp, block reference value (e.g., referring to a block header in a prior device or event block, respectively), and a data reference value. In other cases, a device or event block may include only data values, and may not include a separate header. In one embodiment, a blockchain may include device-event blocks for only a single user 106, where each user 106 may thus have a separate blockchain associated therewith. In another embodiment, a blockchain may include device-event blocks for a plurality of different users 106. In one such embodiment, each device-event block may include or otherwise be associated with an identification value that is unique to the respective user 106. In another such embodiment, digital signatures may be used to associate a device-event block with a user 106. For example, each user 106 may have a cryptographic key pair associated therewith (e.g., generated by the user 106 using a user device 110 or assigned to the user 106 by the blockchain node 104 or another system) that includes a public key and a private key. Any time a new device-event block is created for the user 106, as discussed below, a digital signature may be generated using the user's private key, which may be included in the device-event block (e.g., accompanying the device-event block, included therein, or as a signature of the block itself). The public key may be used to validate the digital signature, which may serve as proof of the association of a particular device-event block to the user 106.

Device-event blocks may be used to store data regarding user devices 110 associated with a user 106 and events related to the user 106 and/or the associated user devices 110. A device block may include, for instance, identification data for each device associated with a user 106 and state information associated therewith. Identification data may include any value that is unique to a user device 110 or otherwise used for identification thereof, such as a unique device identifier (e.g., a unique device identifier (UDID), universally unique identifier (UUID), globally unique identifier (GUID), advertiser identifier, identifier for vendor (IDFV)), media access control (MAC) address, internet protocol (IP) address, telephone number, email address, registration number, serial number, international mobile equipment identity (IMEI) number, mobile equipment identifier (MEID), make and model information of the user device 110, etc., or any combination thereof. State information associated with a user device 110 may include, for example, registration information, removal of the registration status of a user device 110, operating system status for the user device 110, etc. For example, when the user 106 adds a new user device 110 to their collection or wants to remove a user device 110, a new device block may be created that includes all of the updated information accordingly.

An event block may similarly be used to store information regarding events involving the user 106 and/or the user's registered user devices 110. Events may include, but are not limited to, device, payment account, and transaction management events, including the updating of a user device 110, adding (e.g., registering) of a new user device 110, removal of a user device 110, participation in a payment transaction using the user device 110, policy and rules governing events (e.g., an event transaction resulting in value binding to a device/event/sequence), execution of rules, binding of a new payment instrument to a user device 110, unbinding of a bound payment instrument, registration of a new transaction account, removal of a transaction account, binding to a new financial institution, unbinding of a financial institution, reporting of suspicious activity or fraud, enrollment with a service provider, removal of a service provider, installation of a new application program, updating of an operation system (OS), uninstalling of an application program, etc. For example, when the user 106 installs a new application program on a user device 110, a new event may be created with information based thereon (e.g., an identifier for the application program, submitted account data, device identifier for the user device 110, etc.).

In some embodiments, each of the events and devices may be stored in the event or device block, respectively, as data entries therein. In other embodiments, device and/or event blocks may only, or may additionally, store hashes for device information or events, respectively. A hash may be a value that is generated via the application of one or more hashing algorithms to the associated data. For example, when a new event occurs, the data for the event may be collected and then the data may be hashed, where the resulting hash value is stored in the event block. In some cases, all of the hashes for events may be stored in an event block. In some such cases, only new events may have hashes stored in a new event block, where the hashes for prior events may be stored in the original block in which it was added (which may be reviewed at any time given the permanent and immutable nature of the blockchain). In other such cases, a Merkle tree may be used where each event block may include the root of the Merkle tree. In some instances, new event or device hashes may be added sequentially, such that the Merkle tree itself does not need to be maintained, where the root in one event block can be combined with new event hashes in a new block as part of another Merkle tree. Inclusion of hashes in a Merkle tree for identification of the root thereof may be performed in any manner and method that is suitable, which may vary based on implementation of the system 100. In some embodiments, the data reference value included in a device block or event block may be the root of the Merkle tree for the respective data, while the device block or event block may still include the underlying data as data values included therein, such as in a blockchain-in-a-blockchain type implementation.

Accordingly, in an exemplary embodiment, when a new event occurs or the state of a device changes for the user 106, a new device block and event block may both be created for the user 106, which may refer to the most recent device and event block, respectively, in the blockchain, include all of the ongoing device and event data, respectively, for the user 106, and include the root of a Merkle tree for the ongoing data of the respective type. The device block and event blocks may be combined into a device-event block using any suitable method (e.g., addition, hashing, etc.) that is included as a blockchain data value in a new overall block that is added to the blockchain.

In the system 100, device and event information may be submitted by a plurality of different blockchain participants 108. A blockchain participant 108 may be any entity, system, or device that is configured to submit data to a blockchain node 104 that can be used to update state information for a user device 110 or an event associated with the user 106 or a user device 110. A blockchain participant 108 may be, for instance, a user device 110, the user 106, a financial institution, an application program developer or distributor, a merchant, a data storage service, a service provider, etc. For instance, when a user device 110 installs a new application program the user device 110 or the entity that provided the new application program may submit the event to the blockchain node 104 as a blockchain participant 108. In another example, when the user 106 adds a new payment instrument to a user device 110, the issuing financial institution that issued the payment instrument to the user device 110 may submit the event to the blockchain node 104 as the blockchain participant 108. In some embodiments, a blockchain participant 108 must first be registered with the blockchain network 102 and authorized thereby to submit new device and event information to a blockchain node 104. In some instances, a blockchain participant 108 may also be a blockchain node 104.

In some embodiments, the system 100 may be used to store transactional data in the blockchain along with device and event data. In such embodiments, when a new transaction (e.g., payment transaction, electronic data exchange, or other suitable type of transaction) occurs that involves the user 106, data associated therewith may be stored in the blockchain. In some such embodiments, the blockchain may include a transaction block in addition to the device and event blocks for the user 106, where the transaction block may include data values for transactions involving the user 106 (e.g., where each may include information regarding the transaction, such as time and/or date, involved entity or entities, amount, geographic location, product data, etc.) as well as the root of a Merkle tree in a header of the transaction block. In other such embodiments, a transaction may be read by the system 100 as an event, where a new event may be created when a transaction is conducted that involves the user 106 and/or uses a registered user device 110. In these embodiments, the merchant involved in the transaction or the financial institution that issued the transaction account used to fund the transaction may be the blockchain participant 108 that submits the transaction data. In cases where a transaction block is used, the device-event block may be further combined with the transaction block, where every block in the blockchain includes a device-event-transaction block for each user 106.

In some embodiments, multiple blockchains may be used for storage of the data discussed herein. For instance, a first blockchain may be used that stores only device blocks for users 106, while a secondary blockchain may be used for event blocks or for device-event blocks. In another example, a secondary tertiary blockchain may be used that stores transaction blocks, device-transaction blocks, event-transaction blocks, or device-event-transaction blocks. In cases where multiple blockchains may be used, the blockchain nodes 104 may synchronize the updates to the respective blockchains using any suitable method, such as practical byzantine fault tolerance.

In some instances, the blockchain may be used to verify proof of ownership of a user device 110 by a user 106 or other proof of device state information or events that are attributed to the user 106 in the blockchain. In such instances, the user 106 may supply information regarding the user device 110 to a requesting entity, such as a service with which the user 106 is registering the user device 110. In some cases, a blockchain participant 108 may also, or alternatively, be a requesting entity that utilizes the blockchain for verification of proof of ownership or other functions that are facilitated by use of the methods and systems discussed herein. The requesting entity may receive the information regarding the user device 110, which may be provided to the blockchain node 104 or another entity or service. The information regarding the user device 110 may include the device identifier or other information used in the creation of a device hash in the device block that was added to the blockchain. The entity may generate a new hash using the supplied device information and compare it to the hash stored in the user's device-event block, where a match indicates that the user 106 has a user device 110 that is included in the device-event block by virtue of the information used to generate the hash. In some embodiments, the user 106 may additionally or alternatively supply a digital signature generated using the same private key used to sign data in a device-event block, which may be verified to show proof that the user 106 is associated that device-event block.

The methods and systems discussed herein may utilize a blockchain as a common location to store and maintain information regarding a plurality of user devices 110 associated with a single user 106, including device state information as well as any events involving the user 106. The use of a common location may expedite any services, actions, transactions, etc., that involve the user 106 as well as provide a centralized location that may make it easier for the user 106, or any entity authorized by the user, to maintain their data or make their data available to another party. In addition, because the blockchain is immutable, any changes can be clearly tracked for the sake of auditing or to identify any attempted fraud or other nefarious activity. Furthermore, the public nature of the blockchain in terms of blockchain nodes 104 and blockchain participants 108 can ensure that no single entity has control over the data, to prevent tampering, restriction of access, etc. As a result, the methods and systems discussed herein solve the technical problems with existing data storage and synchronization methods by providing a decentralized, yet commonly-located, storage of data in an immutable fashion for a user 106 through a blockchain that includes multiple types of blocks in each block included therein.

Blockchain Node

Figure 2:
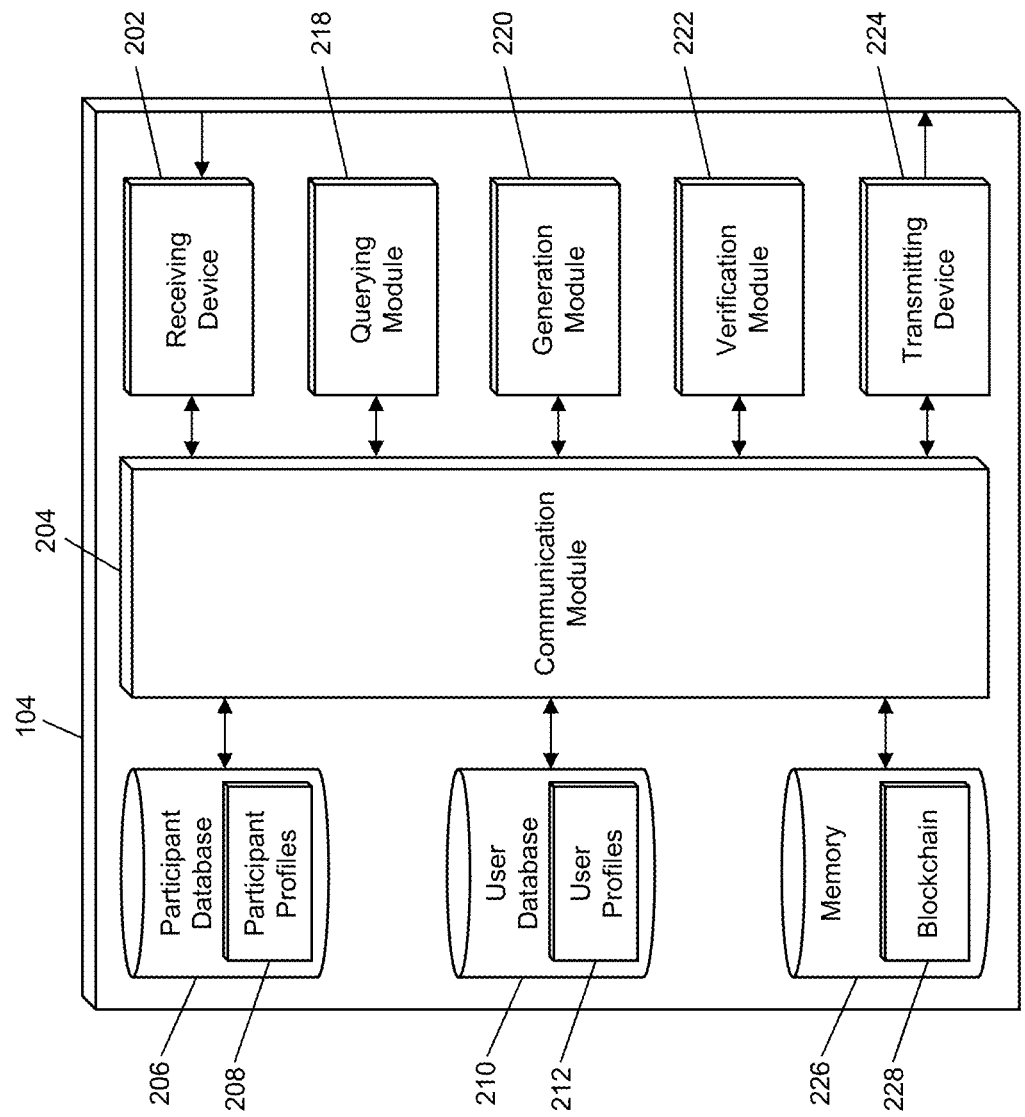
FIG. 2 is a block diagram illustrating a blockchain node of the system of FIG. 1 for maintaining state and device information for all computing devices associated with a user in accordance with exemplary embodiments.

FIG. 2 illustrates an embodiment of a blockchain node 104 in the system 100. It will be apparent to persons having skill in the relevant art that the embodiment of the blockchain node 104 illustrated in FIG. 2 is provided as illustration only and may not be exhaustive to all possible configurations of the blockchain node 104 suitable for performing the functions as discussed herein. For example, the computer system 500 illustrated in FIG. 5 and discussed in more detail below may be a suitable configuration of the blockchain node 104.

The blockchain node 104 may include a receiving device 202. The receiving device 202 may be configured to receive data over one or more networks via one or more network protocols. In some instances, the receiving device 202 may be configured to receive data from other blockchain nodes 104, blockchain participants 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 104, which may be superimposed or otherwise encoded with new blocks for verification and addition to the blockchain. The receiving device 202 may also be configured to receive data signals electronically transmitted by blockchain participants 108, which may be superimposed or otherwise encoded with new events, device state information, transactions, etc., for inclusion in a new block to be added to the blockchain. In cases where digital signatures are used, the transmission may include or otherwise be accompanied by the user's digital signature and/or a digital signature associated with the blockchain participant 108.

The blockchain node 104 may also include a communication module 204. The communication module 204 may be configured to transmit data between modules, engines, databases, memories, and other components of the blockchain node 104 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 104 and external components of the blockchain node 104, such as externally connected databases, display devices, input devices, etc. The blockchain node 104 may also include a processing device. The processing device may be configured to perform the functions of the blockchain node 104 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, verification module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 104 may include a participant database 206. The participant database 206 may be configured to store a plurality of participant profiles 208 using a suitable data storage format and schema. The participant database 206 may be a relational database that utilizes structured query language for the storage, identification, modifying, updating, accessing, etc. of structured data sets stored therein. Each participant profile 208 may be a structured data set configured to store data related to a blockchain participant 108. A participant profile 208 may include, for instance, a public key of a cryptographic key pair associated with the related blockchain participant 108, which may be used to validate digital signatures included in submissions made by the related blockchain participant 108. In cases where a blockchain participant 108 must be registered with the blockchain network 102, a participant profile 208 may include registration data associated with the related blockchain participant 108, such as a communication address.

The blockchain node 104 may also include a user database 210. The user database 210 may be configured to store a plurality of user profiles 212 using a suitable data storage format and schema. The user database 210 may be a relational database that utilizes structured query language for the storage, identification, modifying, updating, accessing, etc. of structured data sets stored therein. Each user profile 212 may be a structured data set configured to store data related to a user 106. For example, a user profile 212 may include a public key of a cryptographic key pair associated with the user 106 for use in validating digital signatures generated by the user's private key. In some cases, a user profile 212 may also include additional information regarding the user's interaction with the blockchain, such as information on blockchain participants 108 that may be authorized to submit new events or state information for the user 106.

The blockchain node 104 may include a querying module 218. The querying module 218 may be configured to execute queries on databases to identify information. The querying module 218 may receive one or more data values or query strings, and may execute a query string based thereon on an indicated database, such as the participant database 206, to identify information stored therein. The querying module 218 may then output the identified information to an appropriate engine or module of the blockchain node 104 as necessary. The querying module 218 may, for example, execute a query on the participant database 206 to identify a participant profile 208 associated with a blockchain participant 108 that submitted a new event or device state to identify a public key included therein to validate a digital signature included with the submission.

The blockchain node 104 may also include a generation module 220. The generation module 220 may be configured to generate data for use by the blockchain node 104 in performing the functions discussed herein. The generation module 220 may receive instructions as input, may generate data based on the instructions, and may output the generated data to one or more modules of the blockchain node 104. For example, the generation module 220 may be configured to generate notifications and other data messages for transmission to user devices 110 and blockchain participants 108, such as prompts for updated registration data, registration notifications, etc. The generation module 220 may also be configured to generate hash values by applying hashing algorithms to data, including the generation of Merkle trees using hash values. The generation module 220 may also be configured to generate block headers and new blocks for device blocks, event blocks, transaction blocks, and general blocks for blockchains as discussed herein. The generation module 220 may also be configured to generate blockchain addresses using public keys, such as for inclusion in a device, event, or transaction block for association with a user 106 using their public key (e.g., stored in their related user profile 212).

The blockchain node 104 may also include a verification module 222. The verification module 222 may be configured to perform verifications and validations for the blockchain node 104 as part of the methods and systems discussed herein. The verification module 222 may receive data to verify or validate as input, may attempt verification or validation, and may output a result of the verification or validation to another module or engine of the blockchain node 104. The verification module 222 may be configured to, for example, verify a digital signature using a public key of a cryptographic key pair, verify new blocks for addition to a blockchain, etc.

In some embodiments, the verification module 222 may also be configured to verify a user (e.g., of the user device 110) or to otherwise perform authentication. For instance, the blockchain node 104 may be configured to perform a cardholder verification method (CVM) or authenticate a user via any suitable method, such as biometrics, personal identification number (PIN), one-time password (OTP), authentication through a separate service (e.g., an issuing financial institution). In some instances, the type of authentication (e.g., CVM) requested may be based on a type of the user device 110, or preferences of the user 106 and/or a financial institution associated with the user's transaction account. In such instances, the type of authentication may be set during the registration process (e.g., based on an OS, make and model, etc. of the user device 110). In other instances, the financial institution or another entity may request the type of authentication to be used during the process discussed herein. In some embodiments, the performing of CVM or other authentication may be based on a level of risk. For example, CVM may not be performed if the user 106 or user device 110 is recognized. In some cases, authentication may be performed by the user device 110 in communication with the blockchain node 104, or the blockchain node 104 may instruct the user device 110 regarding authentication, as may be instructed by the verification module 222. In some instances, such authentication may be combined with other data that may be used to validate the user device 110 and/or a submission for addition to the blockchain. In some cases, data related to the use of CVM or other authentication may be stored in the blockchain, such as a blockchain data entry that includes data indicating that CVM was performed, not performed, was successful, was invalid, etc. In some such cases, the use of CVM may be stored as an event, or may be part of the device data for the user device 110 in a device block.

The blockchain node 104 may also include a transmitting device 224. The transmitting device 224 may be configured to transmit data over one or more networks via one or more network protocols. In some instances, the transmitting device 224 may be configured to transmit data to other blockchain nodes 104, blockchain participants 108, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to other blockchain nodes 104 that may be superimposed or otherwise encoded with new blocks for verification and addition to a blockchain. The transmitting device 224 may also be configured to electronically transmit data signals to blockchain participants 108, which may be superimposed or otherwise encoded with requests for data (e.g., registration data, additional information regarding events or devices, transaction data, etc.), submission confirmations, requested blockchain data, etc.

The blockchain node 104 may also include a memory 226. The memory 226 may be configured to store data for use by the blockchain node 104 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the blockchain node 104 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store a blockchain 228, or data associated therewith. For instance, the blockchain 228 may be comprised of the device-event blocks as discussed above. The memory 226 may be configured to store, for example, hashing algorithms for generating blocks, credentials for validation, usage rule templates, communication data for blockchain nodes 104, communication data for blockchain participants 108 and user devices 110, message formatting standards, digital signature algorithms, blockchain address generation algorithms, etc.

Generation of Device-Event Blocks

Figure 3:
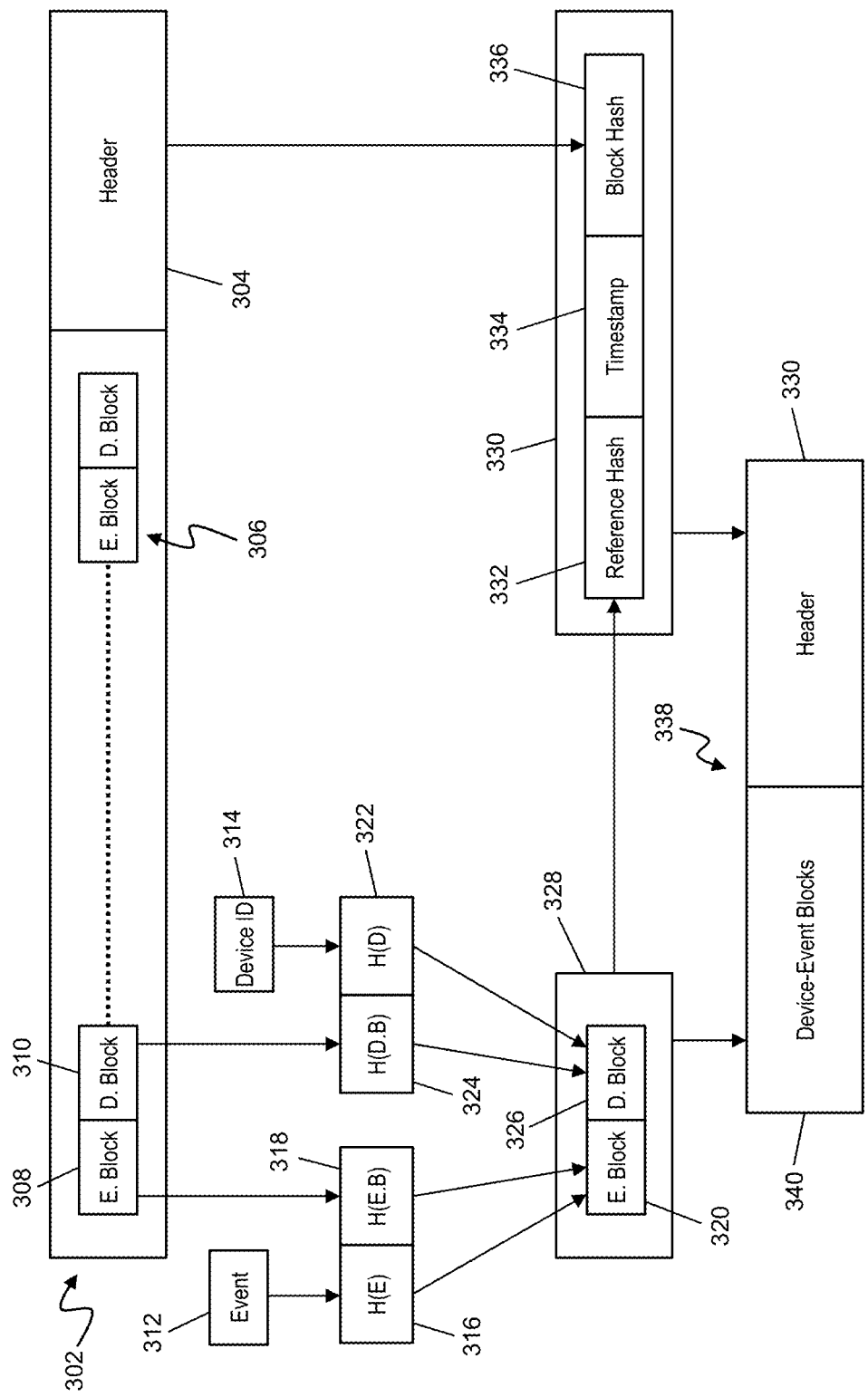
FIG. 3 is a diagram illustrating an architecture of blocks in the blockchain of the system of FIG. 1 in accordance with exemplary embodiments.

FIG. 3 illustrates the generation of a new block in the blockchain of the system 100 illustrated in FIG. 1 that includes a device-event block for a user 106. It will be apparent to persons having skill in the relevant art that the example architecture of the block in FIG. 3 is an example and that alternative architectures may be used, such as in cases where a transaction block may also be included, as discussed above.

As illustrated in FIG. 3, when a new block is to be generated, a blockchain node 104 first uses the most recent block 302 that has been added to the blockchain. The most recent block includes a block header 304 and a plurality of device-event blocks 306. The block header 304 may include a block reference value, referring to a prior block in the blockchain, a data reference value referring to the plurality of device-event blocks 306 in that most recent block 302, as well as a timestamp, which may indicate that the block is the most recent block 302 (e.g., no other block has a more recent timestamp). Each of the device-event blocks 306 may include an event block 308 and a device block 310. In the embodiment illustrated in FIG. 3, the most recent block 302 may include device-event blocks 306 for a plurality of different users, where each device-event block 306 (e.g., or included event block 308 and device block 110) may include a reference to the user 106 with which the device-event block 306 is associated, such as a blockchain address (e.g., generated using a public key), digital signature (e.g., validated using a public key), user identifier, etc.

The blockchain node 104 may be configured to update the blockchain when a new event 312 occurs or when the state information for a user device 110 is updated, where each user device 110 associated with the user 106 has a unique device identifier 314. In the example illustrated in FIG. 3, a new event 312 occurs and the state information for a user device 110 are both updated. As discussed herein, updates may occur for any user device 110 that is associated with the user 106, such that the blockchain may be updated with new events 312 each time one occurs (e.g., where multiple events 312 may be added to a single block corresponding to each user device 110, separate blocks may be added for each user device 110, or a combination thereof). In instances where only one of the two occurs, some of the actions discussed herein may be optional. For the generation of a new event block, the blockchain node 104 may generate an event hash 316 by hashing the event 312. The blockchain node 104 may also generate an event block hash 318 by hashing the event block 308 associated with the user 106 in the most recent block 302. The blockchain node 104 may then generate a new event block 320, which may include at least the event hash 316 and event block hash 318. In some cases, the new event block 320 may also include the event 312, and may also include any event data included in the event block 308. In some instances, the blockchain node 108 may generate a single hash from the event hash 316 and event block hash 318, such as the root of a Merkle tree using the event hashes of all of the events associated with the user 106.

For new device blocks, the blockchain node 104 may perform similar functions using device data. For instance, the device identifier(s) 314 may be hashed to generate a device hash(es) 322, and the device block 310 (e.g., or blocks 310, as applicable) may be hashed to generate the device block hash 324. These hashes may be combined or otherwise used in the generation of a new device block 326, or additional round of devices in the same block, that is associated with the user 106. Once the device block 326 and event block 320 are both created, the blockchain node 104 may generate a device-event block 328 by combining the device block 326 and event block 320 using any suitable method.

The device-event block 328 may be included in a plurality of device-event blocks 340 that are included in a new block 338 that is to be generated for addition to the blockchain. As discussed above, in some cases, multiple devices and/or events may be addresses in a single device-event block 328, and/or multiple device-event blocks 328 for the user 106 may be included in the new block 338. The new block 338 may also include a new block header 330. The new block header 330 may include a reference hash 332, timestamp 334, and block hash 336. The reference hash 332 may be a hash value that is generated by hashing the plurality of device-event blocks 340 including the new device-event block 328. The timestamp may be the time at which the new block 338 is being generated. The block hash 336 may be a hash value generated by hashing the block header 304 of the most recent block 302 or a hash of the entire most recent block 302 itself. The data may be included in the new block header 330 to maintain the order and immutability of the blockchain.

Exemplary Method for Maintaining State and Event Information

Figure 4:
FIG. 4 is a flow chart illustrating an exemplary method for maintaining state and event information for all devices associated with a user in a common location using a blockchain in accordance with exemplary embodiments.

FIG. 4 illustrates a method 400 for maintaining state and event information for a user and a plurality of computing devices associated with the user that is stored in a common location using a blockchain.

In step 402, a blockchain comprised of a plurality of main blocks may be stored in a memory (e.g., memory 226) of a blockchain node (e.g., blockchain node 104), where each main block includes a block header and at least one device-event block, the block header includes at least a timestamp, a reference hash value, and a block hash value, each at least one device-event block includes at least one device block and at least one event block, and the plurality of main blocks includes a most recent block as indicated by the timestamp included in the respective block header. In step 404, a device registration message including at least a device identifier associated with a new device (e.g., user device 110) and a user identifier associated with a user (e.g., user 106) may be received by a receiver (e.g., the receiving device 202) of the blockchain node.

In step 406, an enrollment event may be created by a processing device of the blockchain node registering the new device to the user, the enrollment event including at least the device identifier. In step 408, an event block hash may be generated by the processing device of the blockchain node using at least an event hash value included in the event block included in the most recent block and the created enrollment event. In step 410, a new event block including at least the generated event block hash may be generated by the processing device of the blockchain node.

In step 412, a device block hash may be generated by the processing device of the blockchain node using at least a device hash value included in the device block included in the most recent block and the device identifier. In step 414, a new device block including at least the generated device block hash may be generated by the processing device of the blockchain node. In step 416, a new device-event block including the generated new event block and the generated new device block may be generated by the processing device of the blockchain node.

In step 418, a new block header may be generated by the processing device of the blockchain node, where generation of the new block header includes generating a new block hash value by hashing the most recent block, generating a new reference hash value by hashing the new device-event block, and generating a new timestamp. In step 420, a new block comprised of the new block header and the new device-event block may be generated by the processing device of the blockchain node. In step 422, the generated new block may be transmitted by a transmitter (e.g., transmitting device 224) of the blockchain node to one or more participants (e.g., blockchain nodes 104, blockchain participants 108, etc.) associated with the blockchain.

In one embodiment, the new event block may further include the event hash value. In some embodiments, the new device block may further include the device hash value. In one embodiment, the event block may further include a nonce. In some embodiments, the new device block may further include a nonce. In one embodiment, the new event block may further include a new event hash generated by hashing the event block included in the most recent block. In some embodiments, the new device block may further include a new block hash generated by hashing the device block included in the most recent block.

In one embodiment, the method 400 may further include: storing, in the memory of the blockchain node, a public key of a cryptographic key pair associated with the user identifier; and generating, by the processing device of the blockchain node, a blockchain address using the public key, wherein the new device-event block includes the blockchain address. In some embodiments, the method 400 may also include: storing, in the memory of the blockchain node, a participant profile including at least a public key of a cryptographic key pair associated with a blockchain participant; and validating, by the processing device of the blockchain node, a digital signature using the public key stored in the participant profile, wherein the digital signature is included in the device registration message. In one embodiment, the method 400 may further include: receiving, by the receiver of the blockchain node, a device verification request requesting proof of ownership of the new device by the user, the device verification request including at least a new device identifier and the user identifier; generating, by the processing device of the blockchain node, a new device block hash using at least the device hash value included in the device block included in the most recent block and the new device identifier; comparing, by the processing device of the blockchain node, the generated new device block hash to the device block hash included in the new device block included in the new device-event block included in the new block; and transmitting, by the transmitter of the blockchain node, a result of the comparison in response to the received device verification request.

Computer System Architecture

Figure 5:
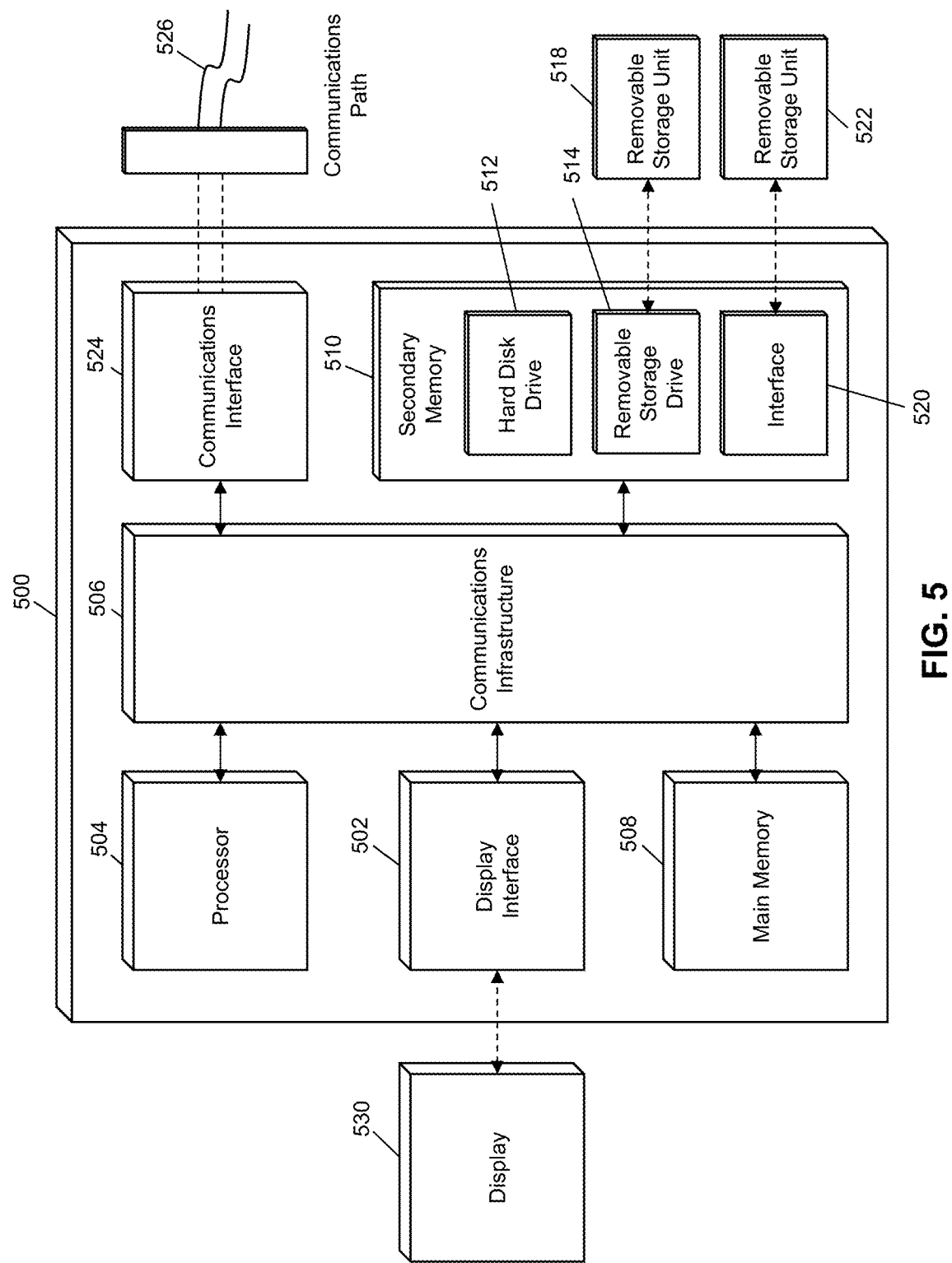
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code compiled on hardware. For example, the blockchain node 104 of FIG. 1 may be implemented in the computer system 500 using hardware, software, firmware, non-transitory computer readable media having instructions stored thereon and various combinations thereof and may be implemented in one or more computer systems or other processing systems. Hardware and software in any operative combination thereof may embody modules and components used to implement the methods of FIGS. 3 and 4.

If programmable logic is used, such logic may execute on a processing platform configured by executable software code to become a specific purpose computer or a special purpose device (e.g., programmable logic array, application-specific integrated circuit, etc.). The disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for maintaining state and event information for all devices associated with a user in a common location using a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for maintaining state and event information for all devices associated with a user in a common location using a blockchain, comprising:
   storing, in a memory of a blockchain node, a blockchain comprised of a plurality of main blocks, where each main block includes a block header and at least one device-event block, the block header includes at least a timestamp, a reference hash value, and a block hash value, each at least one device-event block includes at least one device block and at least one event block, and the plurality of main blocks includes a most recent block as indicated by the timestamp included in the respective block header;
   receiving, by a receiver of the blockchain node, a device registration message including at least a device identifier associated with a new device and a user identifier associated with a user;
   creating, by a processing device of the blockchain node, an enrollment event registering the new device to the user, the enrollment event including at least the device identifier;
   generating, by the processing device of the blockchain node, an event block hash using at least an event hash value included in the event block included in the most recent block and the created enrollment event;
   generating, by the processing device of the blockchain node, a new event block including at least the generated event block hash;
   generating, by the processing device of the blockchain node, a device block hash using at least a device hash value included in the device block included in the most recent block and the device identifier;
   generating, by the processing device of the blockchain node, a new device block including at least the generated device block hash;
   generating, by the processing device of the blockchain node, a new device-event block including the generated new event block and the generated new device block;
   generating, by the processing device of the blockchain node, a new block header, where generation of the new block header includes generating a new block hash value by hashing the most recent block, generating a new reference hash value by hashing the new device-event block, and generating a new timestamp;
   generating, by the processing device of the blockchain node, a new block comprised of the new block header and the new device-event block; and
   transmitting, by a transmitter of the blockchain node, the generated new block to one or more participants associated with the blockchain.

2. The method of claim 1, wherein the new event block further includes the event hash value.

3. The method of claim 1, wherein the new device block further includes the device hash value.

4. The method of claim 1, wherein the new event block further includes a nonce.

5. The method of claim 1, wherein the new device block further includes a nonce.

6. The method of claim 1, wherein the new event block further includes a new event hash generated by hashing the event block included in the most recent block.

7. The method of claim 1, wherein the new device block further includes a new block hash generated by hashing the device block included in the most recent block.

8. The method of claim 1, further comprising:
   storing, in the memory of the blockchain node, a public key of a cryptographic key pair associated with the user identifier; and
   generating, by the processing device of the blockchain node, a blockchain address using the public key, wherein
   the new device-event block includes the blockchain address.

9. The method of claim 1, further comprising:
   storing, in the memory of the blockchain node, a participant profile including at least a public key of a cryptographic key pair associated with a blockchain participant; and
   validating, by the processing device of the blockchain node, a digital signature using the public key stored in the participant profile, wherein
   the digital signature is included in the device registration message.

10. The method of claim 1, further comprising:
    receiving, by the receiver of the blockchain node, a device verification request requesting proof of ownership of the new device by the user, the device verification request including at least a new device identifier and the user identifier;
    generating, by the processing device of the blockchain node, a new device block hash using at least the device hash value included in the device block included in the most recent block and the new device identifier;
    comparing, by the processing device of the blockchain node, the generated new device block hash to the device block hash included in the new device block included in the new device-event block included in the new block; and
    transmitting, by the transmitter of the blockchain node, a result of the comparison in response to the received device verification request.

11. A system for maintaining state and event information for all devices associated with a user in a common location using a blockchain, comprising:
    a blockchain participant configured to transmit a device registration message to a blockchain node, the device registration message including at least a device identifier associated with a new device and a user identifier associated with a user;
    a memory of the blockchain node configured to store a blockchain comprised of a plurality of main blocks, where each main block includes a block header and at least one device-event block, the block header includes at least a timestamp, a reference hash value, and a block hash value, each at least one device-event block includes at least one device block and at least one event block, and the plurality of main blocks includes a most recent block as indicated by the timestamp included in the respective block header;
a receiver of the blockchain node configured to receive the device registration message;
a processing device of the blockchain node configured to
create an enrollment event registering the new device to the user, the enrollment event including at least the device identifier,
generate an event block hash using at least an event hash value included in the event block included in the most recent block and the created enrollment event,
generate a new event block including at least the generated event block hash,
generate a device block hash using at least a device hash value included in the device block included in the most recent block and the device identifier,
generate a new device block including at least the generated device block hash,
generate a new device-event block including the generated new event block and the generated new device block,
generate a new block header, where generation of the new block header includes generating a new block hash value by hashing the most recent block, generating a new reference hash value by hashing the new device-event block, and generating a new timestamp, and
generate a new block comprised of the new block header and the new device-event block;
a transmitter of the blockchain node configured to transmit the generated new block to one or more participants associated with the blockchain; and
the one or more participants configured to receive the generated new block from the blockchain node.

12. The system of claim 11, wherein the new event block further includes the event hash value.

13. The system of claim 11, wherein the new device block further includes the device hash value.

14. The system of claim 11, wherein the new event block further includes a nonce.

15. The system of claim 11, wherein the new device block further includes a nonce.

16. The system of claim 11, wherein the new event block further includes a new event hash generated by hashing the event block included in the most recent block.

17. The system of claim 11, wherein the new device block further includes a new block hash generated by hashing the device block included in the most recent block.

18. The system of claim 11, wherein
the memory of the blockchain node is further configured to store a public key of a cryptographic key pair associated with the user identifier,
the processing device of the blockchain node is further configured to generate a blockchain address using the public key, and
the new device-event block includes the blockchain address.

19. The system of claim 11, wherein
the memory of the blockchain node is further configured to store a participant profile including at least a public key of a cryptographic key pair associated with a blockchain participant,
the processing device of the blockchain node is further configured to validate a digital signature using the public key stored in the participant profile, and
the digital signature is included in the device registration message.

20. The system of claim 11, wherein
the receiver of the blockchain node is further configured to receive a device verification request requesting proof of ownership of the new device by the user, the device verification request including at least a new device identifier and the user identifier;
the processing device of the blockchain node is further configured to
generate a new device block hash using at least the device hash value included in the device block included in the most recent block and the new device identifier, and
compare the generated new device block hash to the device block hash included in the new device block included in the new device-event block included in the new block, and
the transmitter of the blockchain node is further configured to transmit a result of the comparison in response to the received device verification request.

* * * * *